United States Patent
Buerger et al.

[11] Patent Number: 6,078,912
[45] Date of Patent: Jun. 20, 2000

[54] COMPUTER-BASED SYSTEM AND METHOD FOR RESOURCE DETERMINATION AND MANAGEMENT

[75] Inventors: James E. Buerger, Dallas; Lee H. Smith, Grapevine, both of Tex.

[73] Assignee: Travelhost, Inc., Dallas, Tex.

[21] Appl. No.: 09/060,834

[22] Filed: Apr. 15, 1998

[51] Int. Cl.[7] .................................................. G06F 17/30
[52] U.S. Cl. .................. 707/1; 705/7; 705/8; 364/468.05
[58] Field of Search ................................ 707/1; 705/1, 7, 705/8; 364/468.05

[56] References Cited

U.S. PATENT DOCUMENTS

| | | | |
|---|---|---|---|
| 5,003,464 | 3/1991 | Ely et al. | 364/200 |
| 5,276,876 | 1/1994 | Coleman et al. | 395/650 |
| 5,682,530 | 10/1997 | Shimamura | 396/674 |
| 5,721,906 | 2/1998 | Siefert | 707/9 |
| 5,797,129 | 8/1998 | Rohan | 705/8 |
| 5,826,082 | 10/1998 | Bishop et al. | 395/674 |
| 5,826,236 | 10/1998 | Narimatsu et al. | 705/8 |
| 5,862,485 | 1/1999 | Linneweh et al. | 455/450 |
| 5,884,276 | 3/1999 | Zhu et al. | 705/8 |
| 5,889,956 | 3/1999 | Hauser et al. | 395/200.56 |
| 5,918,207 | 6/1999 | McGovern et al. | 705/1 |
| 5,920,622 | 7/1999 | Erb et al. | 379/265 |
| 5,930,156 | 7/1999 | Kennedy | 364/578 |
| 5,961,595 | 10/1999 | Kawagoe et al. | 709/223 |
| 5,963,911 | 10/1999 | Walker et al. | 705/7 |

*Primary Examiner*—Thomas G. Black
*Assistant Examiner*—Frantz Coby

[57] ABSTRACT

For use with a general-purpose computer, systems, methods, processors, computer-executable software and computer-readable media for determining and managing supporting resources pertaining to an object resource. In one embodiment, the system includes: (1) a resource database that, contains resource classes and (2) a supporting resource determination engine, cooperable with the database, that allows a user to determine which of the resource classes relate to the object resource, identify first level supporting resources pertaining to the object resource and identify second level supporting resources pertaining to each of the first level supporting resources.

45 Claims, 8 Drawing Sheets

COMPUTER-BASED SYSTEM AND METHOD FOR RESOURCE DETERMINATION AND MANAGEMENT

TECHNICAL FIELD OF THE INVENTION

The present invention is directed, in general, to computer systems and, more specifically, to a computer-based system and method for determining and managing required resources.

BACKGROUND OF THE INVENTION

In a general sense, everything may be viewed as a resource which either has utility in and of itself for a particular application or in some way contributes to the accomplishment or support of another resource in achieving a particular application. For example, a playground is a community resource. The playground itself is comprised of a collection of other resources which typically includes slides, swings, climbing structures, benches, play areas such as ball diamonds and perhaps swimming pools to name a few possibilities. Each of these resources is, of course, a collection of items which may be viewed as resources themselves. A slide typically contains resources such as a ladder, guard rails, the sliding surface itself, mounting hardware and paint comprising, at least, a partial list. This brief and simple example illustrates that resources are generally hierarchical in nature.

Determination of the resources required to accomplish a specific task, operation or venture is often done in an ad hoc manner. Even well organized but manually directed resource determination schemes often leave much to be desired unless the resource requirements are simple. An experience base in a particular area of resource determination is typically the main reason that certain manually-based approaches are predictably successful. However, if the task, operation or venture is complex, the determination of a full suite of required resources become difficult at best and sometimes nearly impossible to achieve.

Determination of resources has several areas of difficulty that must be addressed. The first area involves being able to identify, or perhaps even classify, all of the types of resources that may be encountered. The ability to do this would be extremely beneficial since it would allow a more systematic approach in general to the determination of the required resources needed to accomplish a given task. The second area involves the ability to determine a complete set of resources that are required to support fully the particular resource being addressed. Without a systematic approach in this area, the possibility of missing at least some of the necessary supporting resources in-the analyzing and planning stages of a project is probable. An approach to resource determination that addresses defined resource categories in the identification of all levels of supporting resources would be very useful. This would allow the definition of categories of resources that may be used in defining all levels of supporting resources needed to support fully the particular resource being addressed.

Another area needed in resource determination is some way to overlay policy that may exist or be needed and would have an impact. on the way in which existing or needed resources would be used in the resource determination process as well as the actual management of the resources. Since available resources are typically somewhat limited, some sort of directing intelligence is needed that would be able to orchestrate and guide the resource determination and management process based on overall priorities and objectives. This would allow the integration of various levels of specifications and procedures to be achieved so that the potential for resource optimization would exist.

Practically, a collection of available resources is a time dependent quantity which is often changing at some indeterminate or unpredictable rate. As this occurs, the ability to shift and redeploy available resources to all of the resources being addressed in a particular application becomes a resource management task that may be complex if an overall operation is extensive. Having a resource management scheme that is computer based and highly systemized would facilitate the accomplishment of resource management.

Accordingly, what is needed in the art is a way both to determine and manage resources that is highly automated and will accommodate varying degrees of resource complexity.

SUMMARY OF THE INVENTION

To address the above-discussed deficiencies of the prior art, the present invention provides, for use with a general-purpose computer, systems, methods, processors, computer-executable software and computer-readable media for determining and managing supporting resources pertaining to an object resource. For purposes of the present invention, an "object resource" is defined as being a resource that, in response to an issue, is either (1) to be managed to fruition, i.e., realized (e.g., acquired, developed or updated) or (2) analyzed to determine the supporting resources that underlie its makeup.

In one embodiment, the system includes: (1) a resource database that contains resource classes and (2) a supporting resource determination engine, cooperable with the database, that allows a user to determine which of the resource classes relate to the object resource, identify first level supporting resources pertaining to the object resource and identify second level supporting resources pertaining to each of the first level supporting resources. Selection, analysis and determination may be conducted to determine the supporting resources that underlie the makeup of an object resource, such as would be applicable in the playground example set forth above. The purpose of selection, analysis and determination may be to develop combinations of actions and supporting resources necessary to allow the realization of a combination of an action and an object resource, e.g., to determine the combination of actions and supporting resources necessary to support the purchase of a building.

The present invention therefore introduces the broad concept of employing a computer to explore, analyze and designate the resource classes that are required to support realization of a particular object resource. The present invention employs an iterative approach, whereby each identified supporting resource is examined to determine to what extent it is itself supported. What results, in effect, is a resource tree which encompasses resources that, due to their subtlety, may have evaded a less rigorous analysis. Of course, this tree may well encompass more than the first and second levels of supporting resources set forth above. By virtue of the computer's systematic approach, a user can be reasonably assured to have determined a collectively exhaustive set of required resources and therefore can look forward to an increased opportunity to realize the object resource successfully.

In one embodiment of the present invention, the system further includes an origination/change policy driver, associated with the supporting resource determination engine, that prompts the user to initiate interaction with the resource database and the supporting resource determination engine. In an embodiment to be illustrated and described, the origination/change policy driver forms the core prompt and motivation for undertaking the analysis and determinations outlined hereinafter.

In one embodiment of the present invention, the resource classes are selected from the group consisting of: (1) time, (2) facilities, (3) equipment, (4) supplies, (5) personnel, (6) funds, (7) systems and (8) products/services. Those skilled in the art will realize that these resource classes encompass those resources that typically may be required to be brought to bear to realize an object resource. Those skilled in the art will also realize, however, that one may group resources into resource classes of different number or having different names. The present invention is not limited to a particular resource class structure or number.

In one embodiment of the present invention, the supporting resource determination engine stores the first and second level supporting resources in the resource database. The resource database therefore ideally reflects the complete collection of supporting resources necessary to realize the object resource. To the extent that a particular analysis may introduce further supporting resources pertaining to a given object resource, the resource database can be made to include those further supporting resources. In this way, the resource database becomes more encompassing and powerful over time.

In one embodiment of the present invention, the resource database contains context-sensitive help text corresponding to relationships between the resources. In a related embodiment, the resource database contains context-sensitive help text corresponding to relationships between the first and second level supporting resources. Those skilled in the art are familiar with context-sensitive help and its advantages in aiding a user. The present invention can employ context-sensitive help to guide a user to a better understanding of interrelationships between different levels of resources.

In one embodiment of the present invention, the supporting resource determination engine includes: (1) an object resource selector that assists the user in selecting the object resource and (2) a resource analyzer that leads the user through a sequential analysis of each of the resource classes relative to the object resource. In an embodiment to be illustrated and described, the selector and analyzer cooperate to produce a list of all identified supporting resources, organized by level.

In one embodiment of the present invention, the supporting resource determination engine comprises a resource planner that assembles a list of the first and second level supporting resources for the user. The user can cause the list to be printed or displayed on a display screen.

In one embodiment of the present invention, the supporting resource determination engine comprises a resource allocator that leads the user through an analysis of each of the first and second level supporting resources to determine therefrom one or more action vehicles (e.g., time/action plan, routine job procedure, etc.) which may be implemented to accomplish realization of the object resource. In an embodiment to be illustrated and described, the allocator causes relationships to be drawn between the supporting resources and specific action vehicles to be taken to marshal the supporting resources.

In one embodiment of the present invention, the supporting resource determination engine comprises a resource allocator that assembles a time-ordered list of steps for one or more action vehicles relating to the object resource. The list may be printed or displayed on a display screen, as desired. The user may then choose to evaluate the timeliness, completeness, accuracy, etc. of the list as it relates to the realization of the object resource and make necessary changes. The origination/change policy driver may also automatically prompt evaluations and updates of the object resource or list according to whether they are accurate, timely, complete and functional as prescribed by guiding principles and regulatory agencies in an economical and efficient manner.

The resource implementor may store each object resource to be realized, along with all action vehicles and respective time-ordered steps related to the object resource. Further, the resource implementor may monitor, evaluate and update to implementation progress related to each object resource to be realized. The resource implementor may also cooperate with the origination/change policy driver to prompt the determination engine to monitor, evaluate and update the propriety of each object resource and its related action vehicles and respective time-ordered steps.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
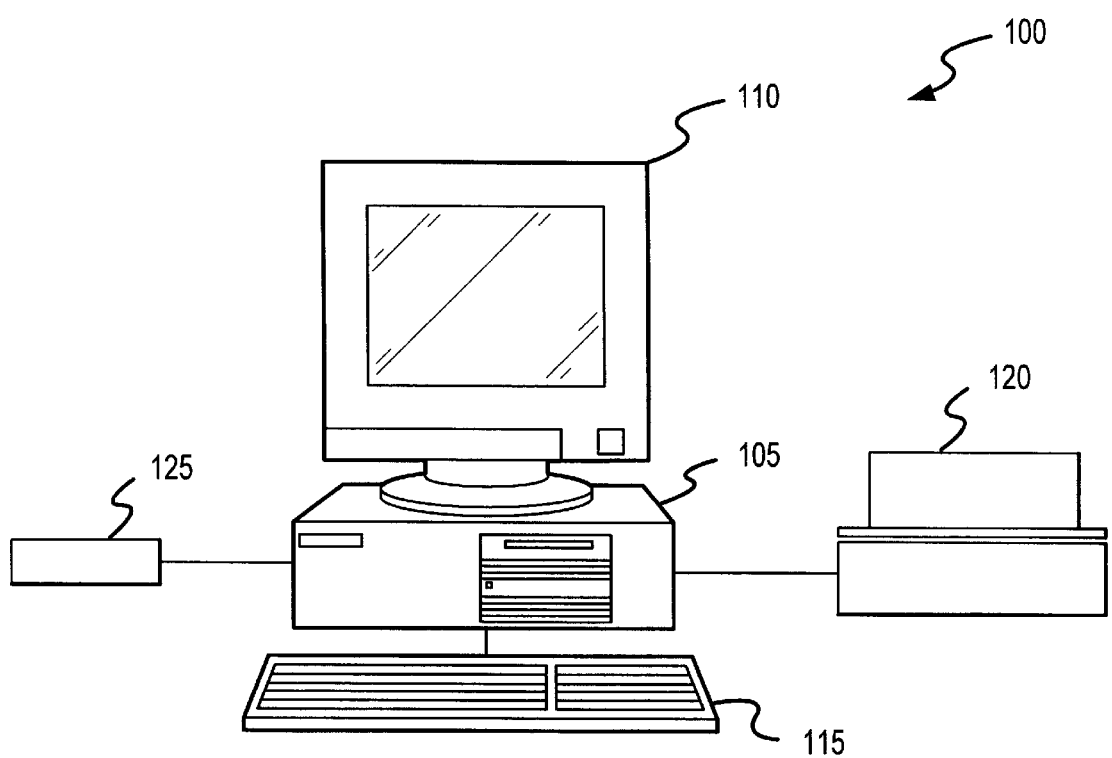
FIG. 1 illustrates a block diagram of a typical general-purpose computer system.

Referring initially to FIG. 1, illustrated is a diagram of a typical general-purpose computer system 100 comprising a computer 105, a monitor 110, a keyboard 115, a printer 120 and a modem 125 for use with a telephone line. The computer 105 contains all of the elements required to use and operate the appropriate software. The monitor 110 allows the results and interactions of the computer 105 to be displayed for interpretation by the user. The keyboard 115 allows the user to interact with the computer 105, and the printer 120 provides for generating hardcopy files related to the software being used. The modem 125 allows data and information to be interchanged with other sites via the phone lines.

Figure 2:
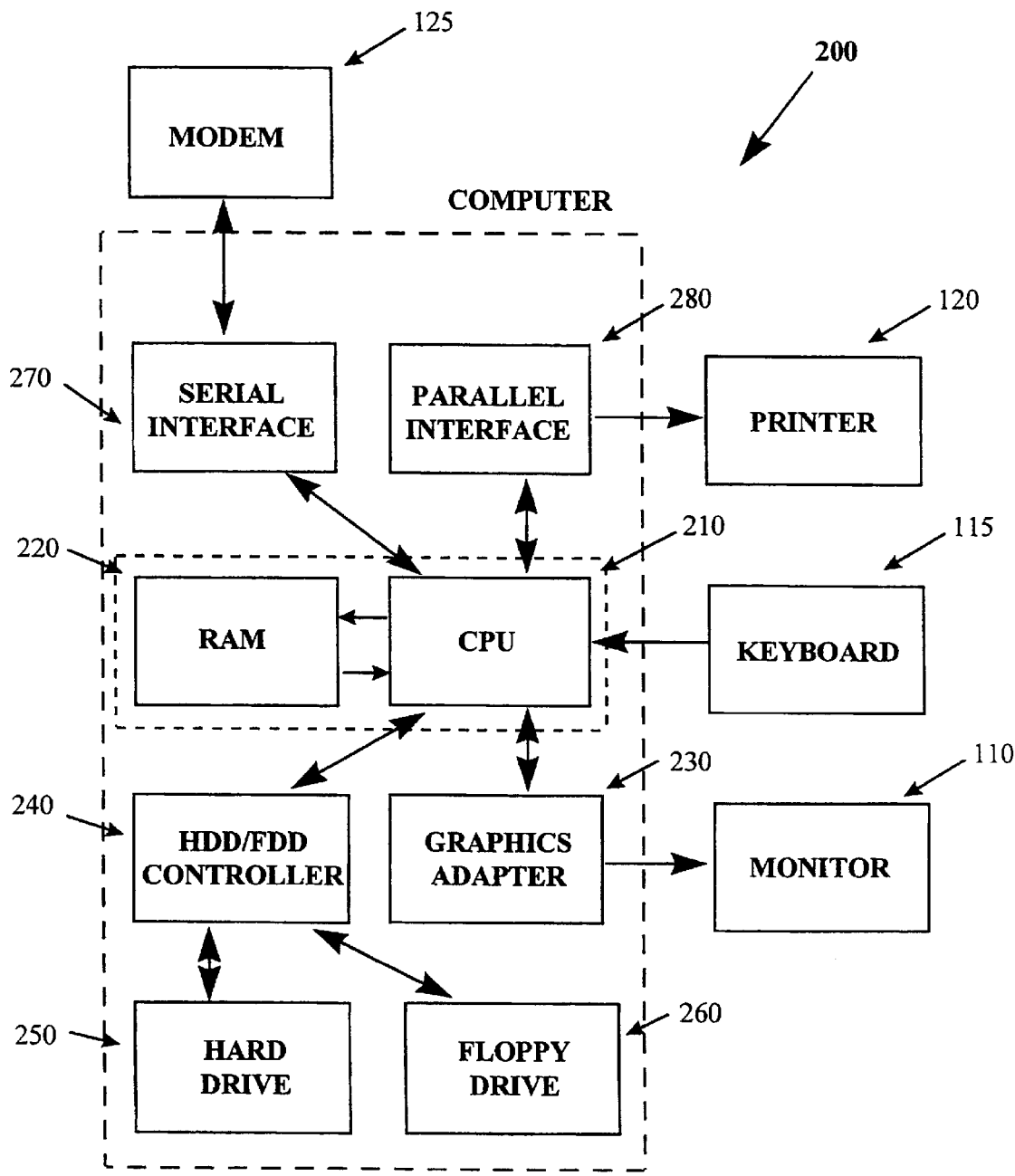
FIG. 2 illustrates a block diagram showing the basic functional components of the computer shown in FIG. 1.

Turning now to FIG. 2, illustrated is a block diagram showing the basic functional components 200 of the computer shown in FIG. 1 showing the basic functional components within the computer 105. The computer 105 is illustrated as comprising a central processing unit ("CPU") 210, random access memory ("RAM") 220, a graphics adapter 230, a hard disk drive/floppy disk drive ("HDD/FDD") controller 240, a hard disk drive 250, a floppy disk drive 260, a serial interface 270 and a parallel interface 280. The CPU 210 is the "heart" of the computer 105 and where the processing takes place. The CPU 210 is connected directly to the keyboard (115 of FIG. 1) from which it receives data or commands. The RAM 220 is used to store or read the immediate results of the data processing or software program execution and is a fast memory element which may also contain software elements for processor instruction execution.

The graphics adaptor 230 accepts data from the CPU 210 and translates it so that it may be displayed on the monitor (110 of FIG. 1). The HDD/FDD controller 240 is used to read and write data from both the hard disk drive 250 and the floppy disk drive 260, which provide for longer term storage. The parallel interface 280 allows for parallel transfer of data, and is generally a faster way to communicate data than the serial interface 270, which may also be known as a communications interface. The parallel interface 280 typically drives the printer (120 of FIG. 1) as shown, while the serial interface 270 typically allows data interchange with other systems via the phone lines through the modem (125 of FIG. 1).

The present invention may be advantageously embodied as a sequence of software instructions executable on the computer system 100 to create the apparatus and carry out the methods set forth herein. Those skilled in the art will recognize that the present invention may alternatively be embodied in hard-wired discrete or integrated circuitry or in analog circuitry.

Figure 3:
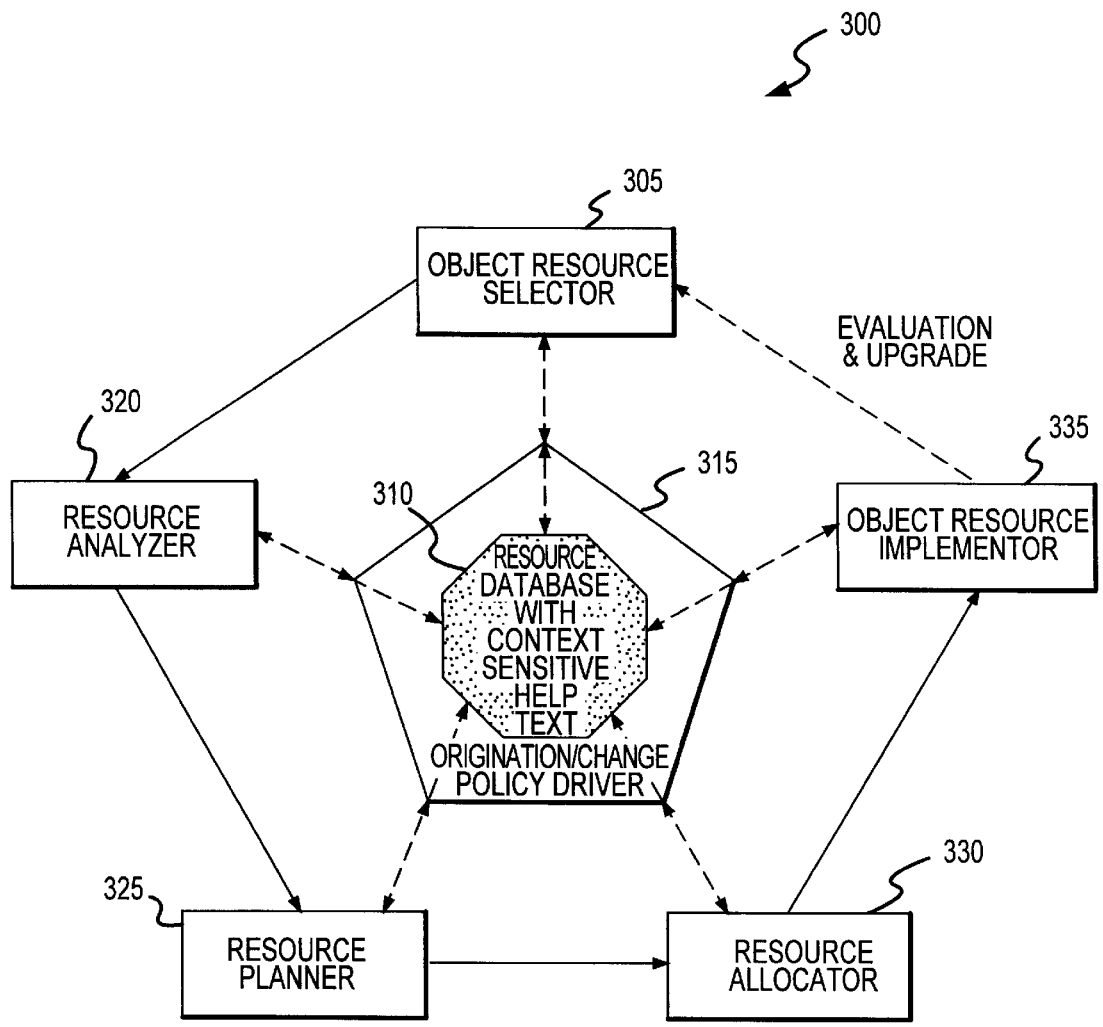
FIG. 3 illustrates a block diagram of a resource determination engine according to one embodiment of the present invention.

Turning now to FIG. 3, illustrated is a block diagram of a resource determination engine 300 according to an embodiment of the present invention. The resource determination engine 300 comprises an object resource selector 305, a resource database 310, an origination/change policy driver 315, a resource analyzer 320, a resource planner 325, a resource allocator 330 and an object resource implementor 335. The resource determination engine 300 is a software system for use with a general-purpose computer system which is capable of determining and managing supporting resources pertaining to an object resource.

The resource determination engine 300 is cooperable with the resource database 310 that contains resources organized within resource classes that a user may employ to determine which resource classes relate to the selected object resource. First level supporting resources which directly pertain to the object resource may be identified. Second level supporting resources which directly pertain to each of the first level supporting resources may also be identified. Continuing in this manner, all of the pertinent levels of supporting resources may be identified. The supporting resource determination engine 300 may store these supporting resources in the resource database 310. The resource database 310 therefore ultimately comprises the complete collection of supporting resources necessary to realize the object resource.

In the present embodiment, the resource database 310 contains resources organized into resource classes selected from the group consisting of: (1) time, (2) facilities, (3) equipment, (4) supplies, (5) personnel, (6) funds, (7) systems and (8) products/services. Those skilled in the art will realize that these resource classes encompass the resources that typically may be required to be brought to bear to realize an object resource.

The resource database 310 may contain context-sensitive help text corresponding to relationships between the resource classes. The resource database 310 may also contain context-sensitive help text corresponding to relationships between the first, a second and other levels of supporting resources that support realization of the object resource. Those skilled in the art are familiar with context-sensitive help and its advantages in aiding a user. The present invention can employ context-sensitive help to guide a user to a better understanding of interrelationships between different levels of resources.

The present invention therefore introduces the broad concept of employing a computer to explore, analyze and designate the resources that are required to support realization of a particular object resource. An iterative approach is employed, in as many dimensions as required, within the resource determination engine 300. The resource determination engine 300 is itself an iterative system in that it is cyclic in nature as may be 'seen from FIG. 3. Each object resource selected for realization may always be evaluated and upgraded once it is realized, as shown. Additionally, each identified supporting resource is examined to determine to what extent it is itself supported, and a cyclic process may be used to address the resources involved as will be discussed later.

What results, in effect, is a resource tree which encompasses resources that, due to their subtlety, may have evaded a less rigorous analysis. By virtue of the computer's systematic approach, a user can be reasonably assured to have determined a collectively exhaustive set of supporting resources required in the realization of the object resource and therefore can look forward to an increased opportunity to realize the object resource successfully.

In the present embodiment, the origination/change policy driver 315 prompts the user to initiate interaction with the resource database 310 and the supporting resource determination engine 300. The origination/change policy driver 315 forms the core prompt and motivation for undertaking the analysis and determinations outlined. The origination/change policy driver 315 also provides a major framework or context for the policies, action vehicles and time-ordered steps related to object resource realization, with the purpose that all policies, action vehicles and time-ordered steps be maintained in an accurate, timely, complete and functional way as prescribed by guiding principles and regulatory agencies in an economical and efficient manner.

The object resource selector 305, directed by the origination/change policy driver 315, assists the user in selecting the object resource to be realized and for which supporting resources at all levels are to be determined. This may be accomplished by selecting from existing computer files or databases, if the object resource has already been previously identified and stored, or by entering the name of the desired object resource and establishing its priority for realization if it has not been previously identified and stored. The resource analyzer 320 leads the user through a sequential analysis of each of the resource classes relative to the object resource. The object resource selector 305 and the resource analyzer 320 cooperate to produce a list of all identified supporting resources, organized by support level.

The resource planner 325 assembles a list of all of the pertinent levels of supporting resources for the user. The user can cause the list to be printed (such as on the printer 120 of FIG. 1) or displayed on a display screen (such as the monitor 110 of FIG. 1). The resource allocator 330 leads the user through an analysis of each of the supporting resources to determine therefrom one or more action vehicles which may be implemented to accomplish realization of the selected object resource. The resource allocator 330 may also cause relationships to be drawn between the supporting resources and specific action vehicles to be implemented to marshal the supporting resources.

The resource allocator 330 also assembles one or more time-ordered lists of steps of one or more action vehicles which may be taken to accomplish realization of the object resource. The list may be printed (such as on the printer 120 of FIG. 1) or displayed on a display screen (such as the monitor 110 of FIG. 1), as desired. The user may then choose to evaluate the timeliness, completeness and accuracy of each list as it relates to the realization of the object resource and make necessary changes. The origination/change policy driver 315 may also automatically prompt evaluations and updates of the propriety of the object resource or each list, at a later time, as to whether they are accurate, timely, complete and functional as prescribed by guiding principles and regulatory agencies in an economical and efficient manner.

The object resource implementor 335 stores each object resource to be realized along with all action vehicles and respective time-ordered steps related to the realization of the object resource. The object resource implementor 335 monitors the implementation status information and propriety management information related to the selected object resource and cooperates with the origination/change police driver 315 in the evaluation and update process described above.

Figure 4:
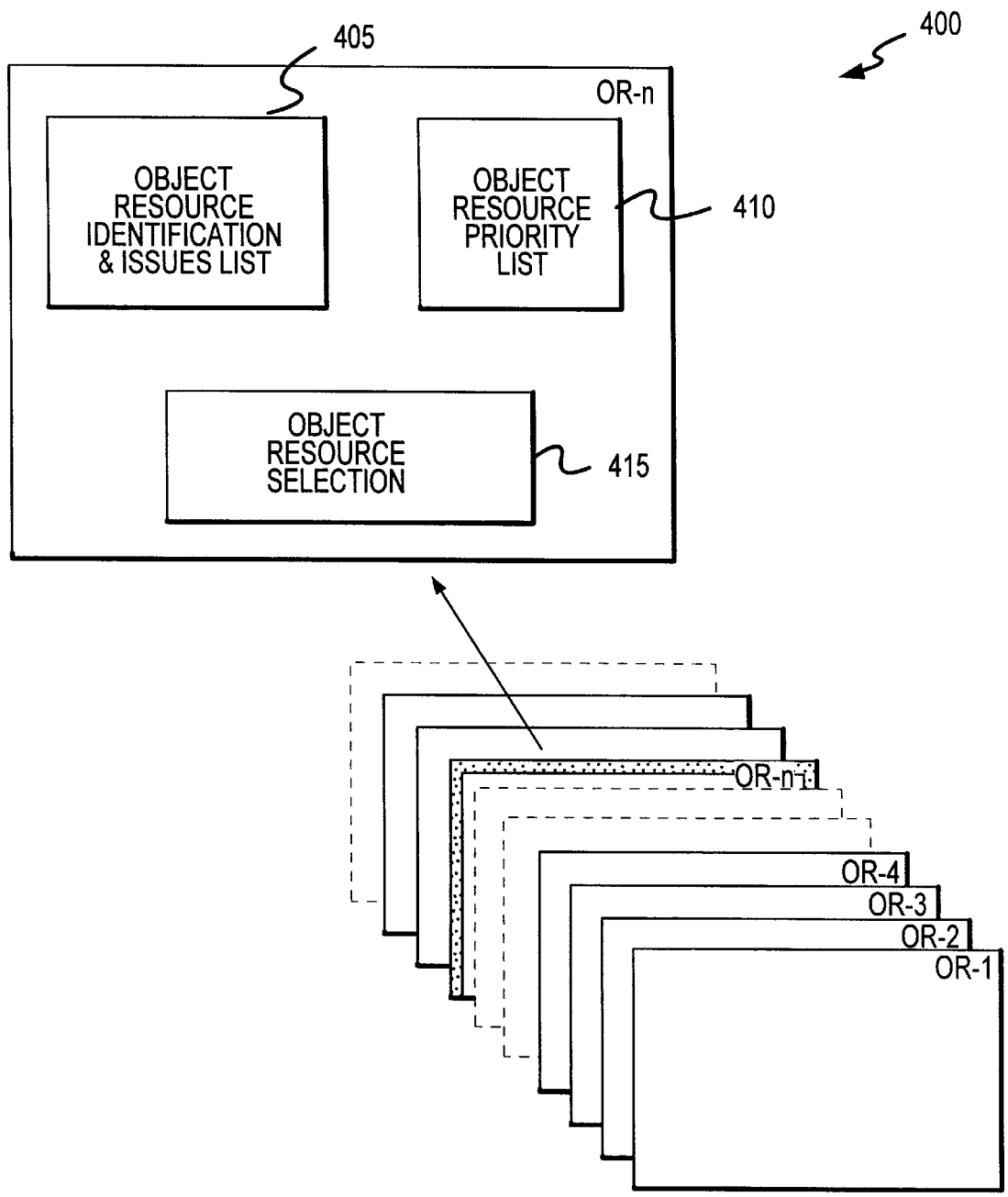
FIG. 4 illustrates a block diagram of an object resource selector used to select a specific object resource according to one embodiment of the present invention.

Turning now to FIG. 4, illustrated is a block diagram of an object resource selector 400 used to select a specific object resource according to one embodiment of the present invention. The resource selector 400 includes an object resource identification and issues list (a block 405), an object resource priority list (a block 410) and an object resource selection mechanism (a block 415). The origination/change policy driver 315, previously identified, requires that as any resource management issue surfaces, a response be developed through realization of an object resource. These object resources and their corresponding issues are cataloged in the object resource identification and issues list (the block 405).

As the object resource is identified, the object resource selector 400 prompts the user to update the object resource priority list (the block 410) of object resources to be selected for realization. When timing is appropriate, the object resource selection mechanism (the block 415) leads the user through this selection of the highest priority object resource from the object resource priority list (the block 410). Selection of the highest priority object resource removes the selected object resource from the object resource priority list (the block 410) and leads the user to engage the resource analyzer 320 as discussed in FIG. 3.

Figure 5:
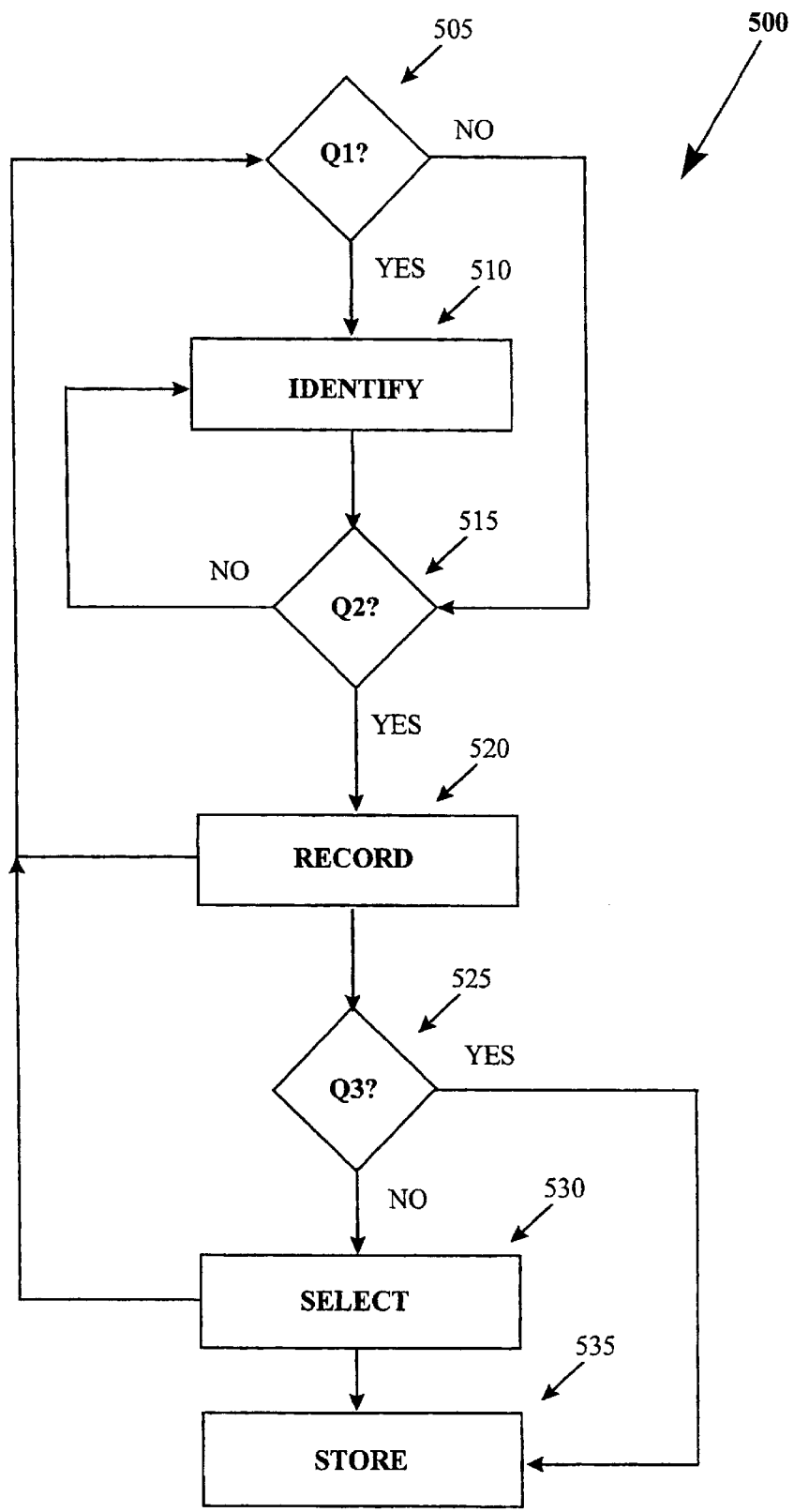
FIG. 5 illustrates a flow diagram of a resource analyzer for performing resource analysis according to one embodiment of the present invention.

Turning now to FIG. 5, illustrated is a flow diagram for performing resource analysis (embodied in a resource analyzer 500) according to one embodiment of the present invention. The resource analyzer 500 focuses on the object resource selected for realization and then, through an iterative process, identifies and records all of the resources needed to support realization of the object resource. Having captured these, the resource analyzer 500 then addresses each of these resource classes, in turn, to determine the next level of resources needed to support each of these resources in the realization of the object resource. This process can continue until all levels of all resources required to support fully the realization of the selected object resource have been determined.

On the first iteration, the first question Q1 (a block 505) of the resource analyzer 500 flowchart asks if at least one time resource exists that has not been identified which is needed in direct support of the object resource selected. If the answer is YES, the time resource is identified by IDENTIFY (a block 510). If the answer to Q1 is NO at any time in the process, it is seen that the process flow moves to the second question Q2 (a block 515). The second question Q2 (the block 515) then asks if all of the time resources have been identified. If the answer is NO, then the loop continues until the user indicates that all of the time resources are identified by IDENTIFY (the block 510). At this point, the answer to Q2 (the block 515) is YES and the time resources are recorded by RECORD (a block 520).

Now, the analysis reverts back to Q1 (the block 505) which asks if there is at least one facilities resource required. A process paralleling that for time resources continues until the user indicates that all of the facilities resources required in direct support of the object resource selected have been identified and recorded. Iterating through the six remaining resource classes of equipment, supplies, personnel, funds, systems and products/services identified in this embodiment, captures all of the remaining resources required in direct support of the object resource selected.

Then, the third question Q3 (a block 525) asks if all identified resources have been selected for analysis, which produces an initial answer of NO. This initiates the second level of analysis where SELECT (a block 530) then selects the first supporting resource identified in the process described above. This carries the process back to Q1 (the block 505) where each of the previously selected first level supporting resources are then analyzed, in turn, to identify what resources are needed to support them by iterating through each of the group of eight resource classes identified in the illustrated embodiment. This analysis process can continue until all levels of all resources necessary to support realization of the selected object resource have been identified by IDENTIFY (the block 510) and recorded by RECORD (the block 520) at which time the answer to Q3 (the block 525) is YES, all identified resources have been selected for analysis. Then, the identified and recorded resources are stored by STORE (a block 535) for use by the resource planner 325 in this embodiment.

Figure 6:
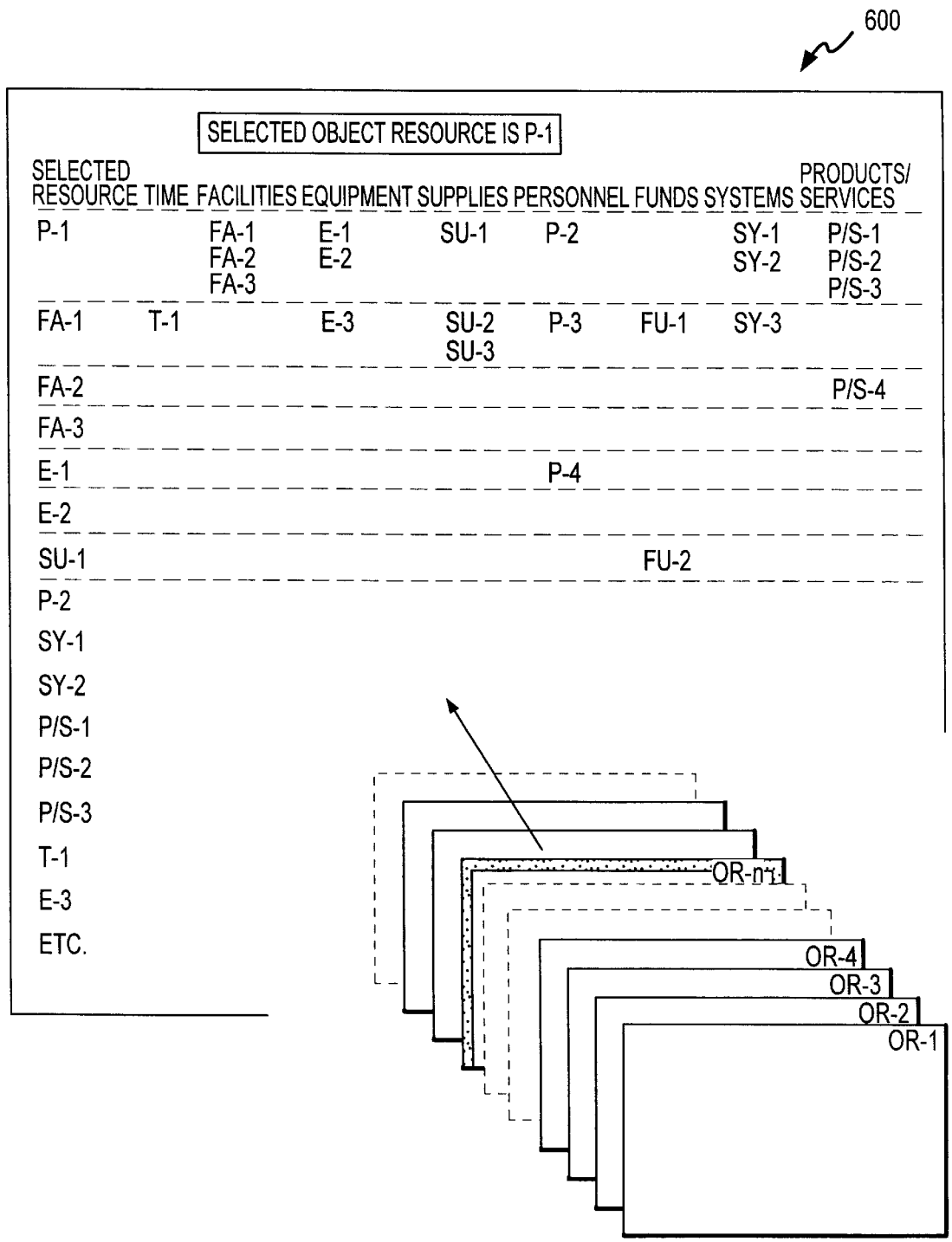
FIG. 6 illustrates a block diagram of a resource planner showing, in particular, an example of how resources may be organized and displayed for planning purposes according to one embodiment of the present invention.

Turning now to FIG. 6, illustrated is a block diagram of a resource planner 600 showing, in particular, an example of how resources may be organized and displayed for planning purposes according to one embodiment of the present invention. This example portrays the results of application of the resource analyzer 320 to only a single (the nth) object resource (OR-n) of the total collection of all object resources that may have been selected. This example presents a tabular format for a selected object resource designated in the table as P-1 (a first personnel resource). The first-level support resources identified by a resource analyzer include no time resources; a first, second and third facilities resource FA-1, FA-2, FA-3; a first and second equipment resource E-1, E-2; a supplies resource SU-1; a second personnel resource P-2; no funds resources; a first and second systems resource SY-1, SY-2; and a first, second and third products/services resource P/S-1, P/S-2, P/S-3.

The next (second) level shows that the first facilities resource FA-1, itself, requires resources of a first time resource T-1, a third equipment resource E-3, a second and third supplies resource SU-2, SU-3, a third personnel resource P-3, a first funds resource FU-1, a third systems resource SY-3 and no products/services resources. The next first-level support resource, the second facilities resource FA-2 requires only a fourth products/services resource P/S-4. The next first-level resource, the facilities resource FA-3 requires no additional support resources. The first-level support resource, the first equipment resource E-1 is seen to require only a fourth personnel resource P-4, and the first-level support resource, equipment resource E-2 requires no additional supporting resources. The first-level supporting resource, supplies resource SU-1 is seen to require only a second supporting funds resource FU-2. In this example, the remainder of the identified resources require no additional supporting resources. This result, unlike results from other traditional resource planning approaches (e.g., experience-based approaches) which are not designed to optimize the probability of obtaining an exhaustive list of support resources, is known to be a relatively exhaustive list since the resource analyzer phase examined each of these resources, in turn, thereby enforcing such to be the case.

The specific collection of resources required to support the realization of each selected object resource forms an element of the total set of resources needed to support all object resources that have been selected, as stated earlier. The resource planner 600 typically monitors usage of all of the resources available to determine ways in which the resources may be shifted, rescheduled or otherwise used to meet both established priorities and desired objectives in an optimum way. This may require the resource planner 600 to be used to construct various resource usage scenarios to test the usage of available resources. The planned list of resources is now ready for use by the resource allocator 330 in this embodiment.

Figure 7:
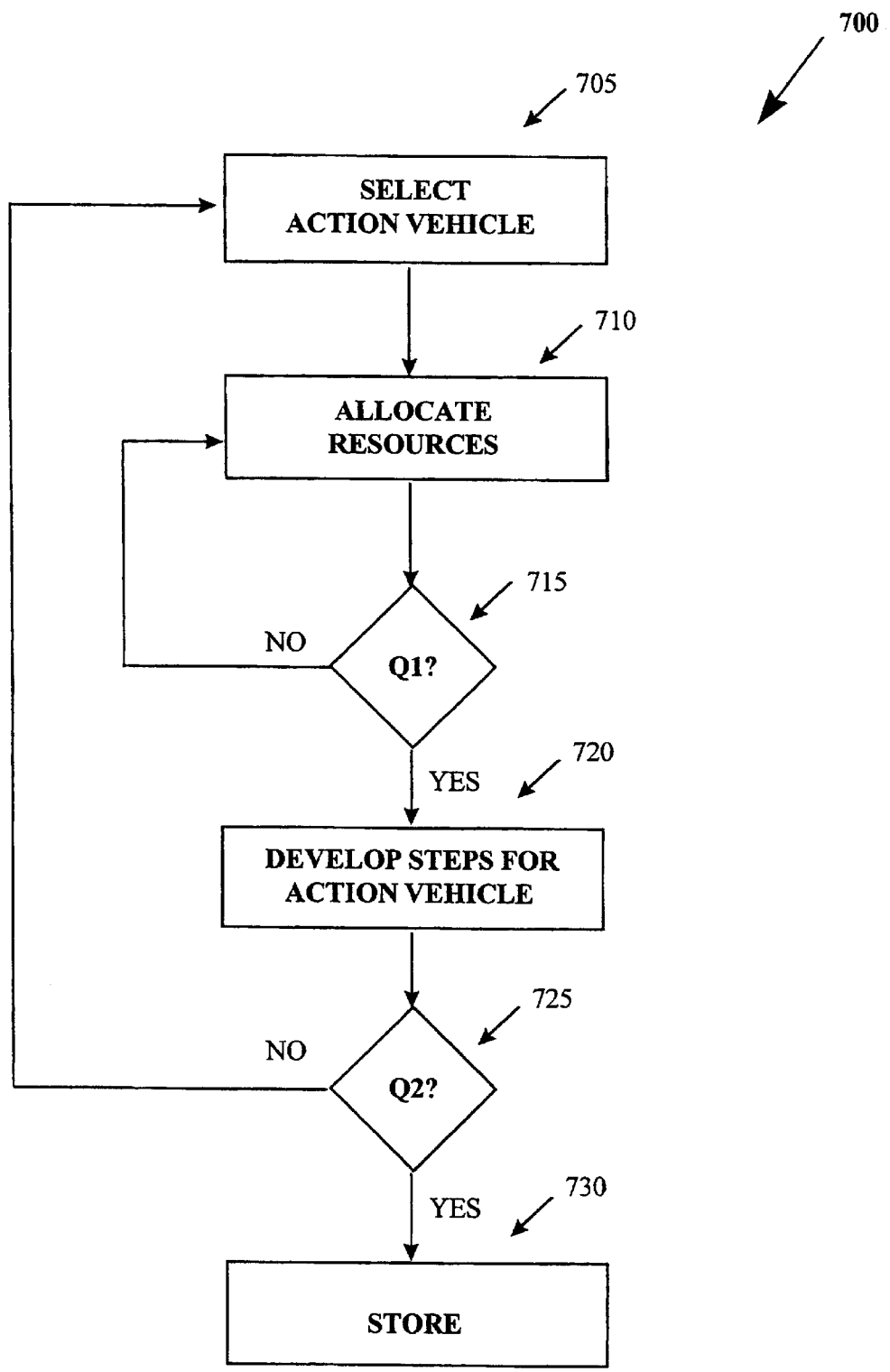
FIG. 7 illustrates a flow diagram of a resource allocator for performing resource allocation needed to support an object resource according to one embodiment of the present invention.

Turning now to FIG. 7, illustrated is a flow diagram for performing resource allocation needed to support the realization of an object resource (embodied in a resource allocator 700) according to one embodiment of the present invention. The resource allocator 700 takes the resources that have been identified and planned in the earlier phases of the resource determination process and links them to one or more necessary and specific action vehicles that are required to accomplish realization of the selected object resource. The resource allocator 700 also assembles one or more time-ordered lists of steps for one or more action vehicles that are required to accomplish realization of the selected object resource.

The example flowchart of FIG. 7 shows that first an action vehicle is selected by SELECT ACTION VEHICLE (a block 705). The format for the action vehicle may reside in a database reserved for such action vehicles or it may be entered as a new action vehicle as the case may require. Next, the resource allocator 700 allocates the first identified, planned and linked resource to the action vehicle by ALLOCATE RESOURCE (a block 710). Then, the first question Q1 (a block 715) asks if all the linked resources have been allocated to this action vehicle. If the answer is NO, the next identified, planned and linked resource is allocated to the selected action vehicle. This process continues until all of the identified and planned resources linked to this action vehicle have been allocated resulting in a YES response to the first question Q1 (the block 715). Then, the resource allocator 700 employs a DEVELOP STEPS FOR ACTION VEHICLE (a block 720) to lead the user through a process to develop a time-ordered list of steps necessary to implement the selected action vehicle.

Then, the second question Q2 (a block 725) asks if all of the action vehicles associated with the realization of this object resource have been completed. If the answer is NO, the process returns to the SELECT ACTION VEHICLE (the block 705) phase and the next action vehicle is selected for allocation of the next appropriate collection of identified, planned and linked resources required for support of the realization of the object resource. This allocating process continues until all linked resources have been allocated to all respective action vehicles, and a list of time-ordered steps has been developed for each action vehicle, and the answer to the second question Q2 (the block 725) is YES. Then, all resource allocated action vehicles and their respective time-ordered list of steps are stored by STORE (a block 730) for use by the object resource implementor 335 in this embodiment.

Figure 8:
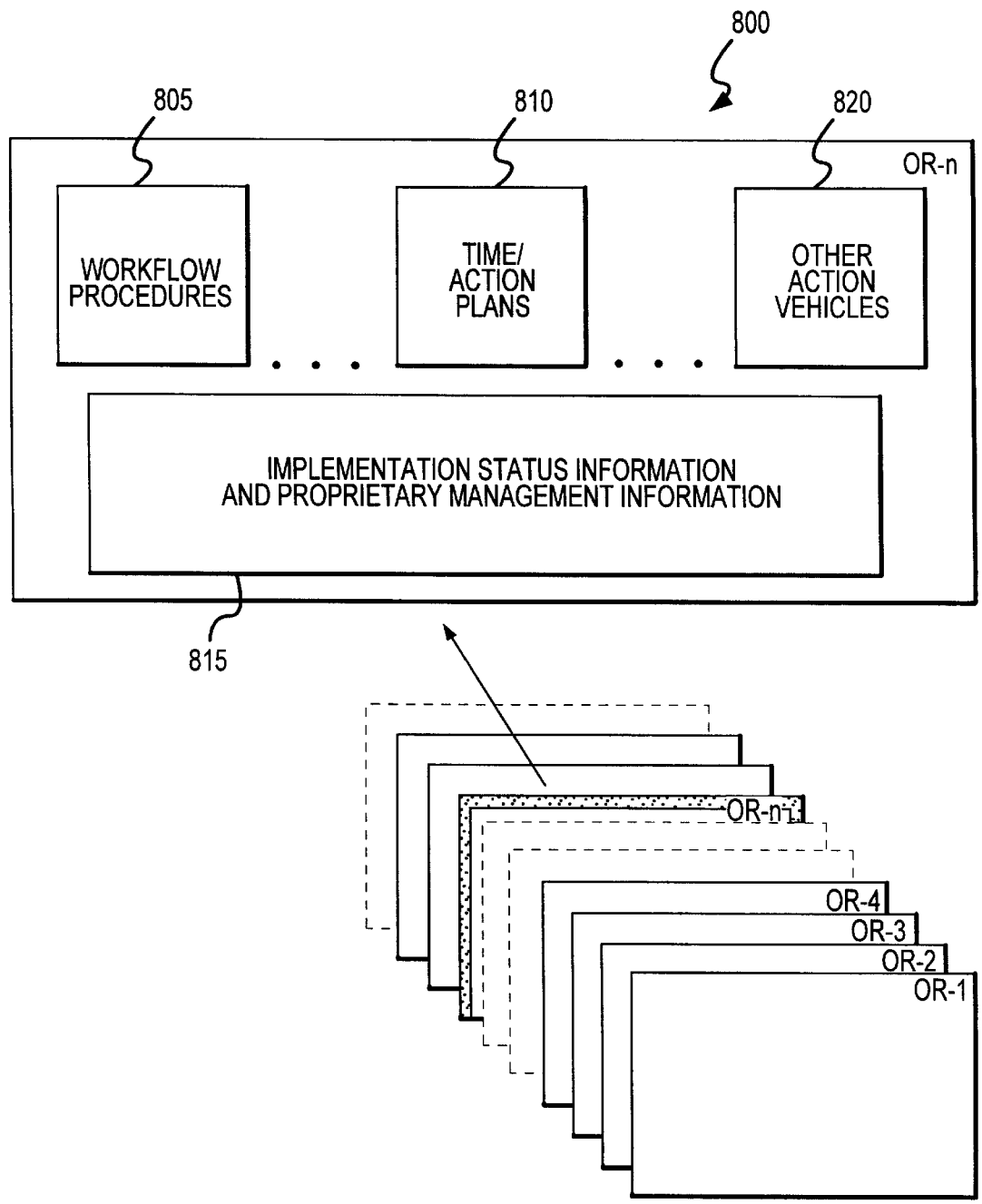
FIG. 8 illustrates a block diagram of an object resource implementor used to manage implementation of a specific object resource according to one embodiment of the present invention.

Turning now to FIG. 8, illustrated is a block diagram of an object resource implementor 800 used to manage realization of a specific object resource according to one embodiment of the present invention. This phase of the resource determination engine 300 may include all of the resource allocated action vehicles previously generated. These would typically include workflow procedures (a block 805), time/action plans (a block 810) and other action vehicles (a block 820) as the case may dictate. Additionally, it may typically include more extensive routine or project management capabilities which may include implementation status information and propriety management information (a block 815) as the object resource may require.

The object resource implementor 800 may actually be used to facilitate the management of a collection of object resources as a situation may dictate. The object resource implementor 800 may be viewed as the "real-time" portion of the resource determination engine 300. If at any time, the origination/change policy driver 315 determines that all or part of an object resource or any of its related action vehicles or time-ordered steps is no longer accurate, timely, complete or functional as prescribed by guiding principles and regulatory agencies in an economical and efficient manner, the object resource, action vehicles or time-ordered steps will come under evaluation and move toward upgrade allowing the entire process to begin again.

From the above, it is apparent that the present invention provides, for use with a general-purpose computer, systems, methods, processors, computer-executable software and computer-readable media for determining and managing supporting resources pertaining to realization of an object resource. In one embodiment, the system includes: (1) a resource database that contains resources organized by resource classes and (2) a is supporting resource determination engine, cooperable with the database, that allows a user to determine which of the resource classes relate to the object resource, identify first level supporting resources pertaining to the object resource and identify second level supporting resources pertaining to each of the first level supporting resources.

Although the present invention has been described in detail, those skilled in the art should understand that they can make various changes, substitutions and alterations herein without departing from the spirit and scope of the invention in its broadest form.

What is claimed is:

1. For use with a general-purpose computer, a system for facilitating a determination and management of supporting resources pertaining to an object resource, comprising:
   a resource database that contains resource classes; and
   a supporting resource determination engine, cooperable with said database, that allows a user to determine which of said resource classes relate to said object resource, identify first level supporting resources pertaining to said object resource and identify second level supporting resources pertaining to each of said first level supporting resources, said supporting resource determination engine including:
   an object resource selector that assists said user in selecting said object resource; and
   a resource analyzer that leads said user through a sequential analysis of each of said resource classes relative to said object resource.

2. The system as recited in claim 1 further comprising an origination/change policy driver, associated with said supporting resource determination engine, that prompts said user to initiate interaction with said resource database and said supporting resource determination engine.

3. The system as recited in claim 1 wherein said resource classes are selected from the group consisting of:
   time,
   facilities,
   equipment,
   supplies,
   personnel,
   funds,
   systems, and
   products/services.

4. The system as recited in claim 1 wherein said supporting resource determination engine stores said first and second level supporting resources in said resource database.

5. The system as recited in claim 1 wherein said resource database contains context-sensitive help text corresponding to relationships between said resource classes.

6. The system as recited in claim 1 wherein said resource database contains context-sensitive help text corresponding to relationships between said first and second level supporting resources.

7. The system as recited in claim 1 wherein said supporting resource determination engine comprises a resource planner that assembles a list of said first and second level supporting resources for said user.

8. The system as recited in claim 1 wherein said supporting resource determination engine comprises a resource allocator that leads said user through an analysis of each of said first and second level supporting resources to determine therefrom an action vehicle and develop a time-ordered set of steps for said action vehicle.

9. The system as recited in claim 1 wherein said supporting resource determination engine comprises a resource implementor that manages implementation, evaluation and updating of actions and information relating to said object resource.

10. For use with a general-purpose computer, a method of facilitating a determination and management of supporting resources pertaining to an object resource, comprising:
    storing resource classes in a resource database;
    allowing a user to determine which of said resource classes relate to said object resource, said step of allowing including:
    assisting said user in selecting said object resource; and
    leading said user through a sequential analysis of each of said resource classes relative to said object resource;
    identifying first level supporting resources pertaining to said object resource; and
    identifying second level supporting resources pertaining to each of said first level supporting resources.

11. The method as recited in claim 10 further comprising prompting said user to initiate said interaction with said resource database.

12. The method as recited in claim 10 wherein said resource classes are selected from the group consisting of:
    time,
    facilities,
    equipment,
    supplies,
    personnel,
    funds,
    systems, and
    products/services.

13. The method as recited in claim 10 further comprising storing said first and second level supporting resources in said resource database.

14. The method as recited in claim 10 further comprising selectively recalling context-sensitive help text corresponding to relationships between said resource classes from said resource database.

15. The method as recited in claim 10 further comprising selectively recalling context-sensitive help text corresponding to relationships between said first and second level supporting resources from said resource database.

16. The method as recited in claim 10 further comprising assembling a list of said first and second level supporting resources for said user.

17. The method as recited in claim 10 further comprising leading said user through an analysis of each of said first and second level supporting resources to determine therefrom an action vehicle and develop a time-ordered set of steps for said action vehicle.

18. The method as recited in claim 10 further comprising managing implementation, evaluation and updating of actions and information relating to said object resource.

19. A processor for facilitating a determination and management of supporting resources pertaining to an object resource that executes instructions to:
    store resource classes in a resource database;
    allow a user to determine which of said resource classes relate to said object resource;
    identify first level supporting resources pertaining to said object resource;
    identify second level supporting resources pertaining to each of said first level supporting resources;
    assist said user in selecting said object resource; and
    lead said user through a sequential analysis of each of said resource classes relative to said object resource.

20. The processor as recited in claim 19 wherein said processor further executes instructions to prompt said user to initiate said interaction with said resource database.

21. The processor as recited in claim 19 wherein said resource classes are selected from the group consisting of:
time,
facilities,
equipment,
supplies,
personnel,
funds,
systems, and
products/services.

22. The processor as recited in claim 19 wherein said processor further executes instructions to store said first and second level supporting resources in said resource database.

23. The processor as recited in claim 19 wherein said processor further executes instructions selectively to recall context-sensitive help text corresponding to relationships between said resource classes from said resource database.

24. The processor as recited in claim 19 wherein said processor further executes instructions selectively to recall context-sensitive help text corresponding to relationships between said first and second level supporting resources from said resource database.

25. The processor as recited in claim 19 wherein said processor further executes instructions to assemble a list of said first and second level supporting resources for said user.

26. The processor as recited in claim 19 wherein said processor further executes instructions to lead said user through an analysis of each of said first and second level supporting resources to determine therefrom an action vehicle and develop a time-ordered set of steps for said action vehicle.

27. The processor as recited in claim 19 wherein said processor further executes instructions to manage implementation, evaluation and updating of actions and information relating to said object resource.

28. For execution in a processor of a general-purpose computer, software for facilitating a determination and management of supporting resources pertaining to an object resource, that:
stores resource classes in a resource database;
allows a user to determine which of said resource classes relate to said object resource;
identifies first level supporting resources pertaining to said object resource;
identifies second level supporting resources pertaining to each of said first level supporting resources;
assists said user in selecting said object resource; and
leads said user through a sequential analysis of each of said resource classes relative to said object resource.

29. The software as recited in claim 28 wherein said software further prompts said user to initiate interaction with said resource database and said supporting resource determination engine.

30. The software as recited in claim 28 wherein said resource classes are selected from the group consisting of:
time,
facilities,
equipment,
supplies,
personnel,
funds,
systems, and
products/services.

31. The software as recited in claim 28 wherein said software further stores said first and second level supporting resources in said resource database.

32. The software as recited in claim 28 wherein said software further selectively recalls context-sensitive help text corresponding to relationships between said resource classes.

33. The software as recited in claim 28 wherein said software further selectively recalls context-sensitive help text corresponding to relationships between said first and second level supporting resources.

34. The software as recited in claim 28 wherein said software further assembles a list of said first and second level supporting resources for said user.

35. The software as recited in claim 28 wherein said software further leads said user through an analysis of each of said first and second level supporting resources to determine therefrom an action vehicle and develop a time-ordered set of steps for said action vehicle.

36. The software as recited in claim 28 wherein said software further manages implementation, evaluation and updating of actions and information relating to said object resource.

37. For use with a general-purpose computer, a storage medium readable by said computer and containing software that:
stores resource classes in a resource database;
allows a user to determine which of said resource classes relate to said object resource;
identifies first level supporting resources pertaining to said object resource;
identifies second level supporting resources pertaining to each of said first level supporting resources;
assists said user in selecting said object resource; and
leads said user through a sequential analysis of each of said resource classes relative to said object resource.

38. The medium as recited in claim 37 wherein said software further prompts said user to initiate interaction with said resource database and said supporting resource determination engine.

39. The medium as recited in claim 37 wherein said resource classes are selected from the group consisting of:
time,
facilities,
equipment,
supplies,
personnel,
funds,
systems, and
products/services.

40. The medium as recited in claim 37 wherein said software further stores said first and second level supporting resources in said resource database.

41. The medium as recited in claim 37 wherein said software further selectively recalls context-sensitive help text corresponding to relationships between said resource classes.

42. The medium as recited in claim 37 wherein said software further selectively recalls context-sensitive help text corresponding to relationships between said first and second level supporting resources.

43. The medium as recited in claim 37 wherein said software further assembles a list of said first and second level supporting resources for said user.

44. The medium as recited in claim 37 wherein said software further leads said user through an analysis of each of said first and second level supporting resources to determine therefrom an action vehicle and develop a time-ordered set of steps for said action vehicle.

45. The medium as recited in claim 37 wherein said software further manages implementation, evaluation and updating of actions and information relating to said object resource.

* * * * *